US009025465B2

(12) United States Patent
Cheng et al.

(10) Patent No.: US 9,025,465 B2
(45) Date of Patent: May 5, 2015

(54) METHODS AND APPARATUSES FOR PERFORMING PROTECTION SWITCHING WITHOUT USING Y.1731-BASED AUTOMATIC PROTECTION SWITCHING (APS) MESSAGES

(75) Inventors: Weiying Cheng, Naperville, IL (US); Chris R. Zettinger, Wheaton, IL (US); Thomas T. Rarick, Wheaton, IL (US)

(73) Assignee: Tellabs Operations, Inc., Naperville, IL (US)

( * ) Notice: Subject to any disclaimer, the term of this patent is extended or adjusted under 35 U.S.C. 154(b) by 676 days.

(21) Appl. No.: 12/607,558

(22) Filed: Oct. 28, 2009

(65) Prior Publication Data

US 2011/0096670 A1      Apr. 28, 2011

(51) Int. Cl.
*H04L 12/46* (2006.01)
*H04L 12/24* (2006.01)

(52) U.S. Cl.
CPC ........ *H04L 12/4641* (2013.01); *H04L 12/4633* (2013.01); *H04L 41/0681* (2013.01); *H04L 41/0816* (2013.01)

(58) Field of Classification Search
CPC ... H04L 1/0006; H04L 1/0025; H04L 1/0028; H04L 2012/5652; H04L 43/00; H04L 12/5696; H04L 12/5825; H04L 12/4641; H04L 41/0816; H04L 12/4633; H04L 41/0681
USPC ......... 370/216, 217, 218, 219, 220, 221, 241, 370/241.1, 242, 244, 250; 379/1.01, 9, 379/15.01
See application file for complete search history.

(56) References Cited

U.S. PATENT DOCUMENTS

| | | | | |
|---|---|---|---|---|
| 6,041,117 A | * | 3/2000 | Androski et al. | 379/268 |
| 6,301,252 B1 | * | 10/2001 | Rangachar | 370/395.2 |
| 6,542,461 B1 | * | 4/2003 | Faye et al. | 370/225 |

(Continued)

OTHER PUBLICATIONS

International Telecommunication Union—ITU-T Telecommunication Standardization Sector of ITU—Ethernet Protection Switching—Series G: Transmission Systems and Media, Digital Systems and Networks, Series Y: Global Information Infrastructure, Internet Protocol Aspects and Next-Generation Networks (2006).

(Continued)

*Primary Examiner* — Obaidul Huq
(74) *Attorney, Agent, or Firm* — Hamilton, Brook, Smith & Reynolds, P.C.

(57) ABSTRACT

To perform protection switching between tunnels in a network, Y.1731-based APS messages are often sent from a management system to nodes at the tunnels' end-points. If the management system is located near one node (local node) and far away from the other node (remote node), the APS message, which operates at the Ethernet service layer, travels to the remote node slower than traffic over the tunnels. This slower transmission time may prevent the remote node from performing a switch within a desired timeframe. The disclosed embodiments include a 1:1 bidirectional VLAN-based protection arrangement that accomplishes a 50 millisecond switching time without using Y.1731-based APS messages. The embodiments accomplish this by sending a switching command from the management system to the local node and modifying a message already traveling from the local node to the remote node to include a switching message that causes the remote node to perform the switch.

16 Claims, 10 Drawing Sheets

(56) References Cited

U.S. PATENT DOCUMENTS

| | | | |
|---|---|---|---|
| 2002/0101967 A1* | 8/2002 | Eng et al. | 379/114.01 |
| 2004/0064764 A1* | 4/2004 | Gomez | 714/47 |
| 2005/0195815 A1* | 9/2005 | Chaudhuri | 370/389 |
| 2005/0249124 A1* | 11/2005 | Elie-Dit-Cosaque et al. | 370/242 |
| 2008/0281987 A1* | 11/2008 | Skalecki et al. | 709/253 |
| 2009/0073988 A1* | 3/2009 | Ghodrat et al. | 370/395.53 |
| 2009/0157851 A1* | 6/2009 | Dake et al. | 709/220 |
| 2011/0038634 A1* | 2/2011 | DeCusatis et al. | 398/79 |

OTHER PUBLICATIONS

International Telecommunication Union—ITU-T Telecommunication Standardization Sector of ITU—OAM Functions and Mechanisms for Ethernet Based Networks—Series Y: Global Information Infrastructure, Internet Protocol Aspects and Next-Generation Networks (2006).

IEEE Standard for Local and Metropolitan Area Networks, Virtual Bridged Local Area Networks Amendment 10: Provider Backbone Bridge Traffic Engineering, IEEE Computer Society (2009).

* cited by examiner

METHODS AND APPARATUSES FOR PERFORMING PROTECTION SWITCHING WITHOUT USING Y.1731-BASED AUTOMATIC PROTECTION SWITCHING (APS) MESSAGES

BACKGROUND OF THE INVENTION

Elements of a network, such as peer User-to-Network Interfaces (UNIs), may be controlled by another component of the network, such as an Element Management System (EMS). Standard protocols for communication between UNIs exist, such as the International Telecommunications Union (ITU) management standard known as Y.1731, which is a protocol that exchanges Operation, Administration, and Management (OAM) parameters end-to-end from UNI to UNI. The Y.1731 standard may be used for services requiring protection switching by, for example, sending a Y.1731-based Automatic Protection Switching (APS) message between two UNIs in band to perform a particular switching action. Such a message consumes extra bandwidth between the two UNIs. If the Y.1731-based APS messages are not used, the EMS typically sends switching commands to both UNIs separately through a Data Communication Network (DCN), which takes longer than the 50 milliseconds switch performance required by many service level agreements. According to the standard, the two UNIs may also monitor a connection between the UNIs by exchanging continuity check messages (CCMs) up to, for example, 300 times per second, for supporting protection of the connection.

SUMMARY OF THE INVENTION

According to the disclosed embodiments, a node in a communications network may include a translation module that is configured to translate a switch command, received from a management system, to a switch message to cause a peer node in the communications network to perform a switching action consistent with the switch command. The node may also include a packet generation module that generates a packet with the switch message embedded in the packet, a transmission module that transmits the packet to the peer node, and a switching module that is configured to perform a switching action consistent with the switch command received from the management system.

Also disclosed is a switch device for implementing a resilient Virtual Local Area Network (VLAN) tunnel. According to the disclosed embodiments, the switch device may include interfaces to working and protection service VLANs and a module that is in operative communication with the working and protection VLANs and that is configured to direct traffic bound for the resilient VLAN tunnel to either the working or the protection service VLAN.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
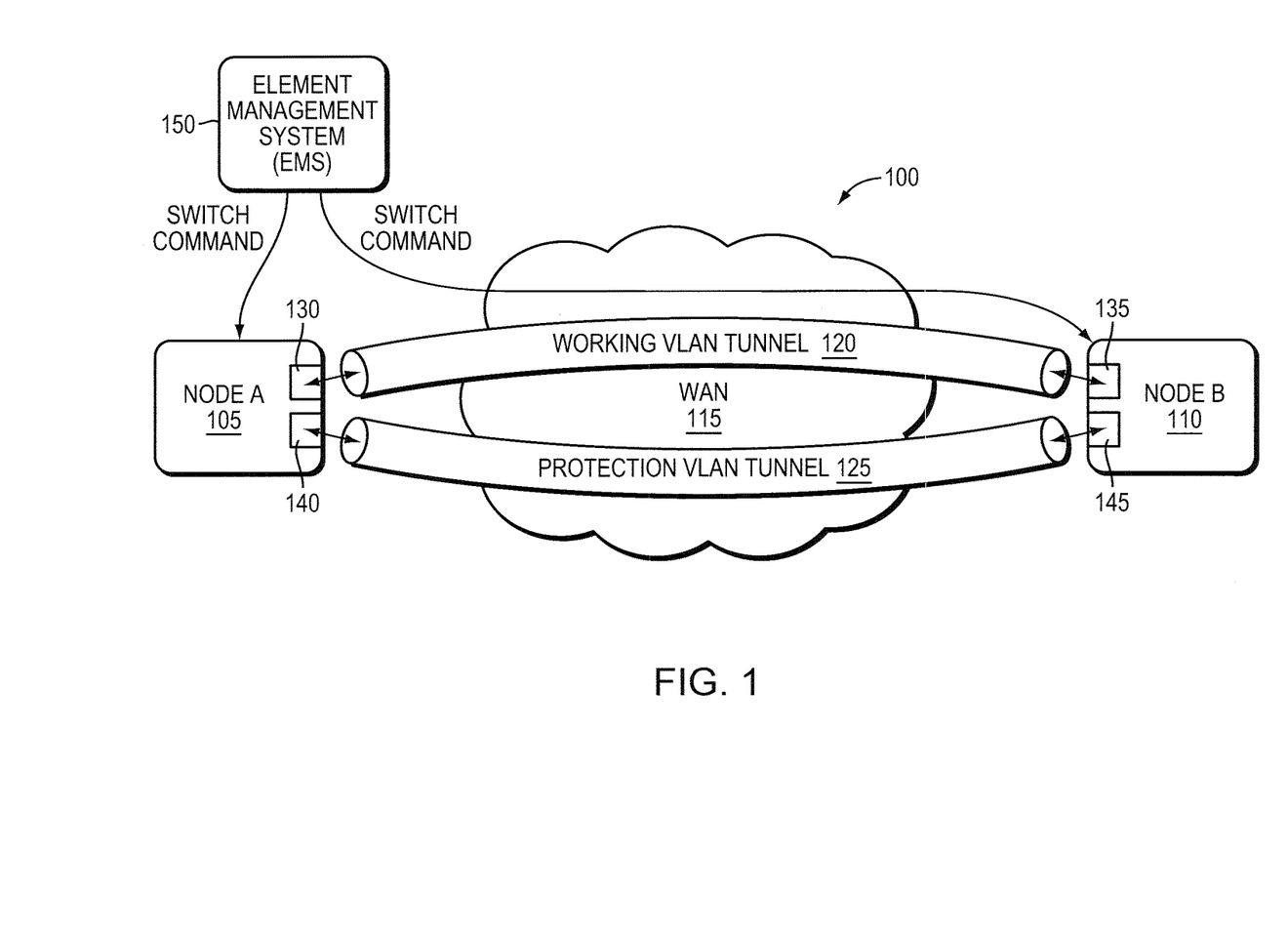
FIG. 1 is a network diagram illustrating a resilient Virtual Local Area Network (VLAN) tunnel.

FIG. 1 is a network diagram illustrating a resilient Virtual Local Area Network (VLAN) tunnel. The Resilient VLAN Tunnel (RVT) includes two nodes 105, 110, a Wide Area Network (WAN) 115, and two VLAN tunnels 120, 125 between the nodes. One VLAN tunnel may be a working tunnel 120, and the other may be a protection tunnel 125 that protects traffic of the working tunnel 120. Each tunnel may interface with the nodes 105, 110 via respective ports 130, 135, 140, 145. For example, the working VLAN tunnel 120 interfaces with node A 105 via port 130 and interfaces with node B 110 via port 135. A management system 150, such as an Element Management System (EMS), may be used to manage the nodes 105, 110. As shown in FIG. 1, the management system 150 may be local to one node 105 and remote from the other node 110. Additionally, the EMS may be located remote from both nodes 105, 110.

Network users may require supporting the protection for such point-to-point tunnels across provider bridges or provider backbone bridges for VLAN-based Layer-2 networks with a 50-100 millisecond switching time. The G.8031 standard defines a 1:1 bidirectional protection scheme for VLAN, but the use of Y.1731-based Automatic Protection Switching (APS) messages is required, which increases the network traffic overhead. Without using Y.1731-based APS messages, the EMS 150 would typically send switching commands, such as, for example, Forced Switch (FS), Manual Switch (MS) or Lock Out Protection (LoP) commands, to the nodes 105, 110 at the ends of the tunnels commanding the nodes to perform a certain switching function. Because the EMS 105 may be located closer to one node 105 (local to node 105) and may be located farther away from the other node 110 (remote from node 110), the APS message would need to travel through the Data Communication Network (DCN) before reaching the remote node 110. In some embodiments, the EMS 105 may be located remote from both nodes 105, 110. Because a DCN is designed to operate at the Transmission Control Protocol/Internet Protocol (TCP/IP) network level for management planes, the switch command travels through the network at a slower rate than, for example, traffic flowing over the VLAN tunnels 120, 125. The relatively slow transmission time of the APS message to the remote node 110 may cause the remote node 110 to be unable to perform the switching action within a desired switching time (e.g., 50 milliseconds), or may cause frames to be duplicated or misordered, which in unacceptable in a Layer-2 network.

The 802.1Qay standard defines a protection scheme for Provider Backbone Bridge with Traffic Engineering (PBB-TE), but it is for the Traffic Engineering Service Instances (TESIs) between two Customer Backbone Ports (CBPs) and not for provider bridge or customer bridge networks. Even for a PBB-TE network, the protection defined in 802.1Qay is not applicable for the protection between Provider Network Ports (PNPs) or between a PNP and CBP. Further, the 802.1Qay standard does not define a method to exchange Lockout of Protection (LoP), Force Switch (FS), or Manual Switch (MS) commands between peer network nodes, which may result in either mismatch defects, misordered frames, or duplicated frames when LoP, FS, or MS commands are issued from a management system.

In contrast to the above approaches, the disclosed embodiments involve a 1:1 bidirectional VLAN-based protection arrangement that accomplishes a 50 millisecond switching time without using Y.1731-based APS messages and without generating misordered or duplicated frames. The embodiments accomplish this by sending a switching command from the EMS 150 to the local node 105 and modifying a continuity check message (CCM) traveling from the local node 105 to the remote node 110 to include a switching message to cause the remote node 110 to perform a switching action that is consistent with the switching command from the EMS 150. The CCM may be modified by adding a Type-Length-Value element to the CCM.

The switch may be caused by either a fault in the network or a request from a management system. In 1:1 protection arrangements, two point-to-point C-VLANs/S-VLANs/B-VLANs are used as tunnels, where one is used as a working tunnel and the other is used as a protection tunnel. In 1:N protection arrangements, N+1 point-to-point C-VLANs/S-VLANs/B-VLANs are used, where N tunnels are used as working tunnels and one tunnel is used as a protection tunnel.

Continuity check messages (CCMs) are used to monitor the health of the tunnels and, in an example embodiment, are sent in 3.3 millisecond intervals to achieve 50 millisecond switch time. According to the disclosed embodiments, an organization-specific Type-Length-Value (TLV) element may by included in the CCM to exchange switch requests, such as LoP, FS, and MS commands, between two nodes. The organization-specific TLV in the CCM may also be used to exchange information for supporting dual-homed protection arrangements. End points for the point-to-point C-VLAN/S-VLAN/B-VLAN protection tunnel can be CBP, CEP, CNP, CBP or PNP, and Layer-2 control protocols and MAC learning may be disabled for the point-to-point VLAN used for protection. The switching action performed by a node may be implemented based on port type. For example, for a CEP, port based CNP, and CBP, a VLAN registration table swap may be used to perform the switch between VLAN tunnels, and for a service tag (S-tag) based CNP, CBP, and PNP, a VLAN Identifier (VID) translation may be used to perform the switch.

Advantages of the disclosed embodiments include an ability to use the embodiments in a customer VLAN network, provider VLAN network, or provider backbone network, and to save traffic overhead as a result of not using Y.1731-based APS messages. The embodiments provide 1:1 bidirectional protection for end-to-end VLANs between (1) a CBP and CBP in customer VLAN networks, (2) a Customer Edge Port (CEP)/CNP and CEP/CNP in service VLAN networks, that is, between service VLAN UNIs (S-UNIs), (3) a PNP and PNP in service VLAN networks, that is, between service VLAN Network-to-Network Interfaces (S-NNIs), (4) a CEP/CNP and PNP in service VLAN networks, that is, between an S-UNI and S-NNI, (5) a CBP and CBP in provider backbone VLAN networks, that is, between backbone VLAN UNIs (B-UNIs), (6) a PNP and PNP in provider backbone VLAN networks, that is, between backbone VLAN NNIs (B-NNIs), and (7) a CBP and PNP in provider backbone VLAN networks, that is, between a B-UNI and B-NNI. Further, the approach can work with 802.1Qay in PBB-TE networks between CBPs, can work with dual-homed protection arrangements, can be extended to support VLAN-based dual-homed protection, and can be extended to support 1:N VLAN-based protection.

Figure 2:
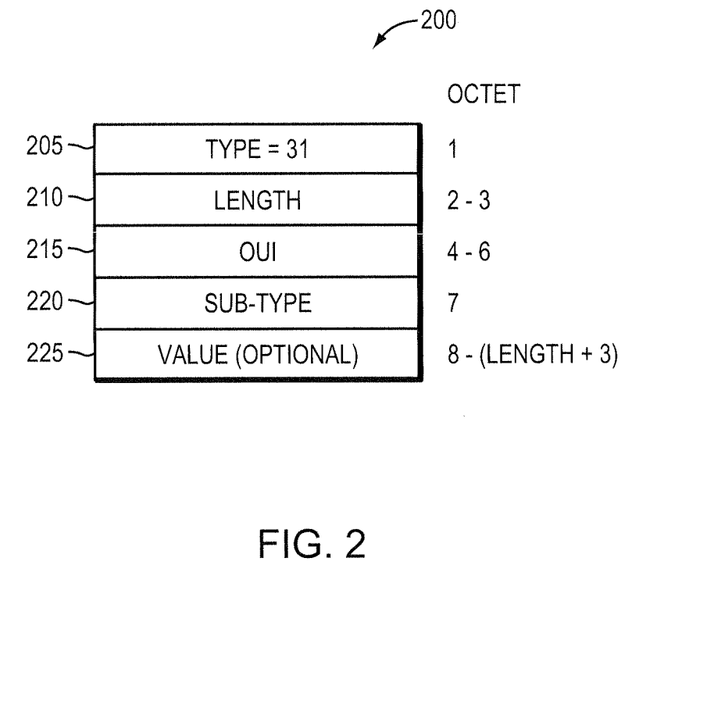
FIG. 2 is a diagram illustrating an example Type-Length-Value (TLV) element format for exchanging switching messages between network nodes.

FIG. 2 is a diagram illustrating an example Type-Length-Value (TLV) element format 200 for exchanging switching messages between network nodes. TLV elements may be used within data communication protocols to encode optional information in a message, and include Type 205, Length 210, and Value 225 fields. The size of the Type and Length fields 205, 210 are fixed, and the size of the Value field 225 is variable. Typically, the Type field 205 is a number indicating the type of the TLV element, the Length field 210 indicates the size of the Value field 225 (e.g., the number of bytes of the Value field 225), and the Value field 225 contains the data of the TLV element.

The particular TLV shown in FIG. 2 is an organization-specific TLV, which also includes an Organizationally Unique Identifier (OUI) field 215 and a Sub-Type field 220. In this example, the Type field 205 is set to 31, which indicates that the TLV is an organization-specific TLV. The OUI field 215 may include an organization-specific identifier, and the Sub-Type field 220 may indicate a more-specific type of TLV element. According to the disclosed embodiments, the Value field 225 may be one byte in length, where the value indicates the switch message being communicated to a peer node. For example, a value of 0 may indicate that no message is being sent, a value of 1 may indicate a "Manual Switch to Working" message, a value of 2 may indicate a "Manual Switch to Protection" message, a value of 3 may indicate a "Force Switch" message, and a value of 4 may indicate a "Lock Out Protection" message.

Figure 3:
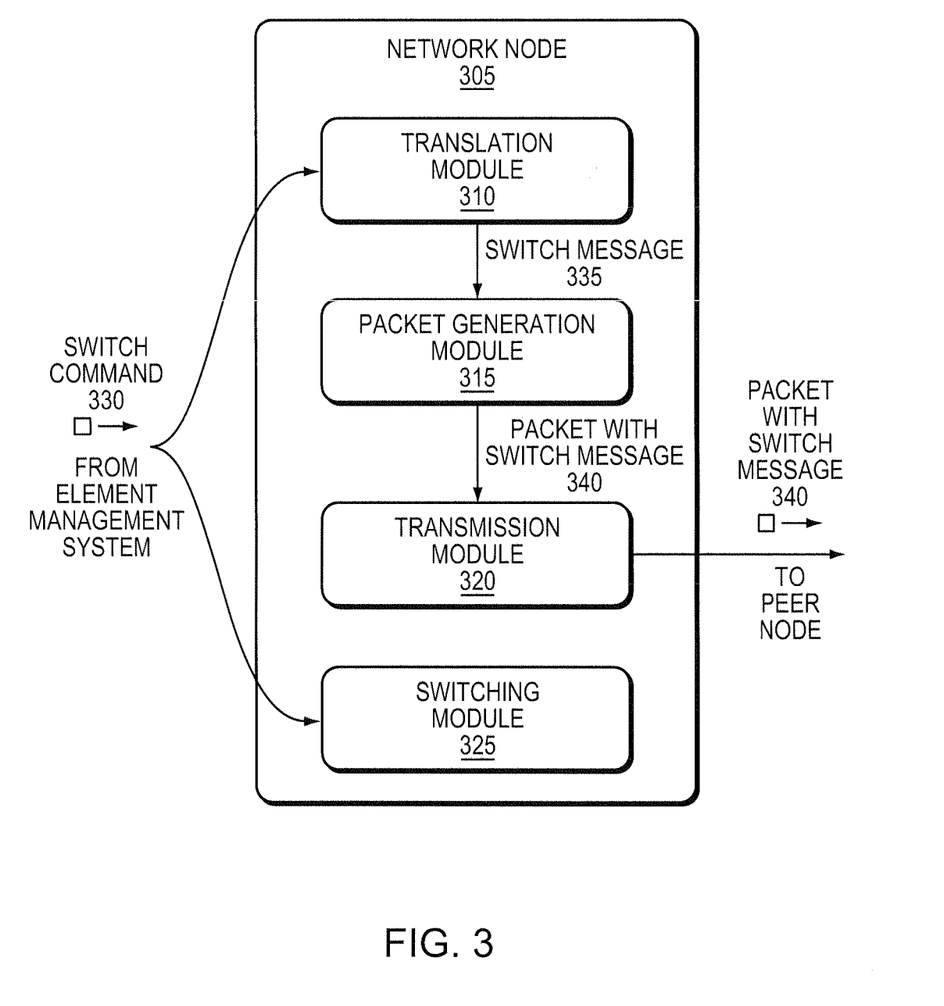
FIG. 3 is a block diagram illustrating a network node including modules of an example disclosed embodiment.

FIG. 3 is a block diagram illustrating a network node 305 including modules of an example disclosed embodiment. As described above, the node 305 includes a translation module 310 that translates a switch command 330 to a switch message 335 for a peer node, a packet generation module 315 that generates a packet 340 with the switch message 335 embedded in the packet 340, a transmission module 320 to transmit the packet 340 to the peer node, and a switching module 325 that performs a switching action consistent with the switch command 330.

The switch message 335, when received by the peer node, causes the peer node to perform a switching action consistent with the switch command 330, such as, for example, a manual switch to working path, manual switch to protection path, force switch, or lock out protection action. The packet 340 may be an Operation, Administration, and Maintenance (OAM) frame and, more specifically, may be a continuity check message (CCM) that includes an additional type-length-value element that includes the switch message 335. The type-length-value element may also include a traffic bit to indicate that traffic is transmitted by the node in a dual-homed network configuration.

The node 305 may receive the original switch command 330 from a management system, such as, for example, an Element Management System (EMS), Network Management System (NMS), or craft station. In some embodiments, the node 305 may be locally connected to the management system, and in others, remotely connected to the management system via a Data Communications Network (DCN).

Additionally, the switching module 325 may be configured to perform, in an event the node 305 receives from the peer node a packet that includes a switch message based on a switch command received at the peer node from the management system, a switching action consistent with the switch command received at the peer node and the switch message received from the peer node. Further, if the packet from the peer node includes a traffic bit in the type-length-value information, the switching module 325 may further be configured to perform a switching action consistent with the traffic bit.

Figure 4:
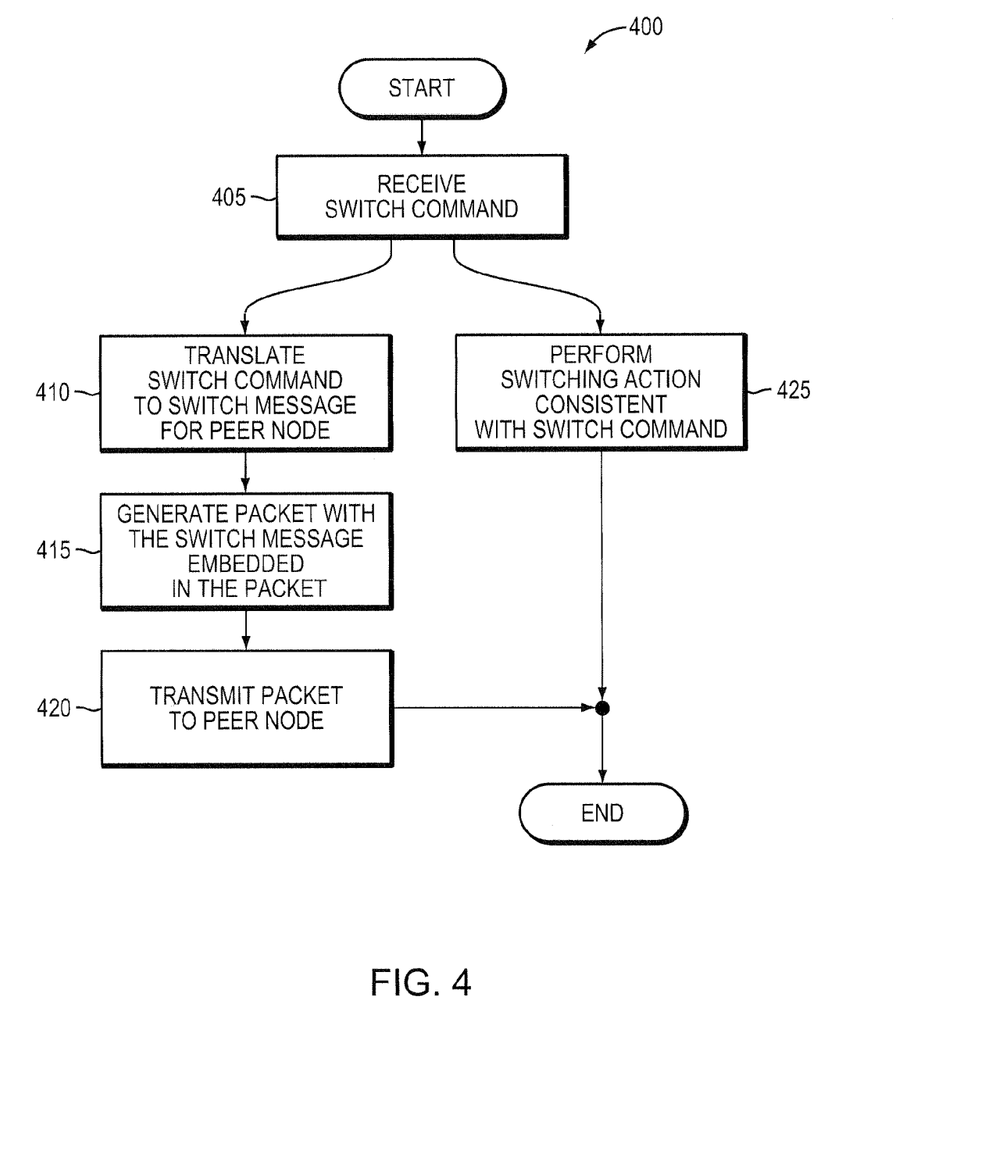
FIG. 4 is a flow diagram illustrating transmitting switch messages in a communications network.

FIG. 4 is a flow diagram illustrating a method for transmitting switch commands in a communications network. According to the example method, a switch command, received from a management system (405), is translated to a switch message to cause a peer node in the communications network to perform a switching action consistent with the switch command (410). The method then generates a packet with the switch message embedded in the packet (415) and transmits the packet to the peer node (420). At the same time, or before or after translating, generating, and transmitting, a switching action may be performed that is consistent with the switch command received from the management system (425).

Figure 5:
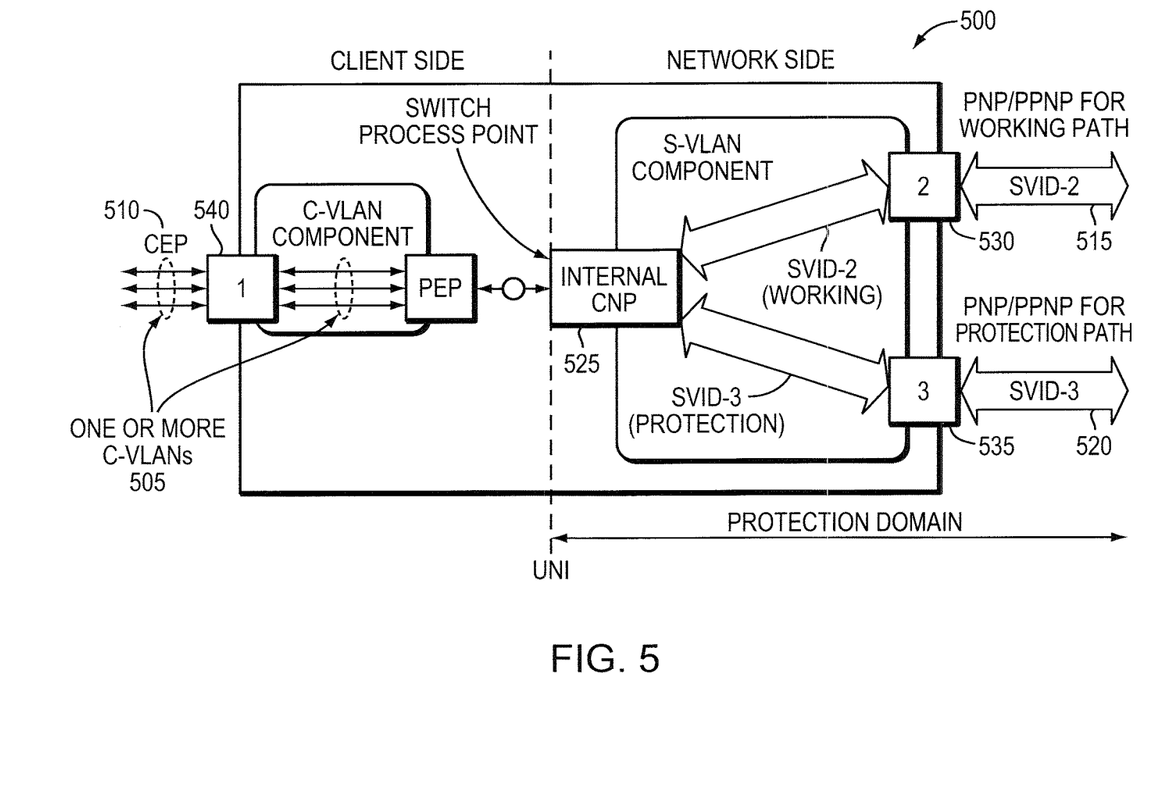
FIG. 5 is a block diagram illustrating an Ethernet Virtual Private Line (EVPL) protected by a Resilient VLAN Tunnel (RVT).

FIG. 5 is a block diagram illustrating an Ethernet Virtual Private Line (EVPL) protected by a Resilient VLAN Tunnel (RVT). According to the example embodiment, one or more customer VLANs (C-VLANs) 505 connected to a Customer Edge Port (CEP) 510 of a switch 500 may be mapped to one or more S-VLAN based EVPLs at an internal Customer Network Port (CNP) 525 where a UNI is located. According to the example embodiment, the EVPL is protected by a Resilient VLAN Tunnel made up of two S-VLAN tunnels 515, 520, identified by VLAN Identifiers (e.g., S-VID=2 and S-VID=3). Working tunnel 515 (S-VID=2) is a point-to-point S-VLAN tunnel between port 2 530 and CNP 525, and protection tunnel 520 (S-VID=3) is a point-to-point S-VLAN tunnel between port 3 535 and CNP 525. Both working and protection tunnels 515, 520 use continuity check messages (CCMs) to monitor the health of the tunnels and may report a fault to an Automatic Protection Switching (APS) state machine (not shown). Under normal conditions (i.e., no fault), C-VLAN frames may be mapped to the working tunnel 515 (S-VID=2). Upon a fault condition, the C-VLAN frames may be mapped to the protection tunnel 520 (S-VID=3) using a C-S swapping registration table. The switching point is at the internal CNP 525 and may in some embodiments be controlled by an APS state machine (not shown). In this embodiment, the protection domain is between UNIs.

Figure 6:
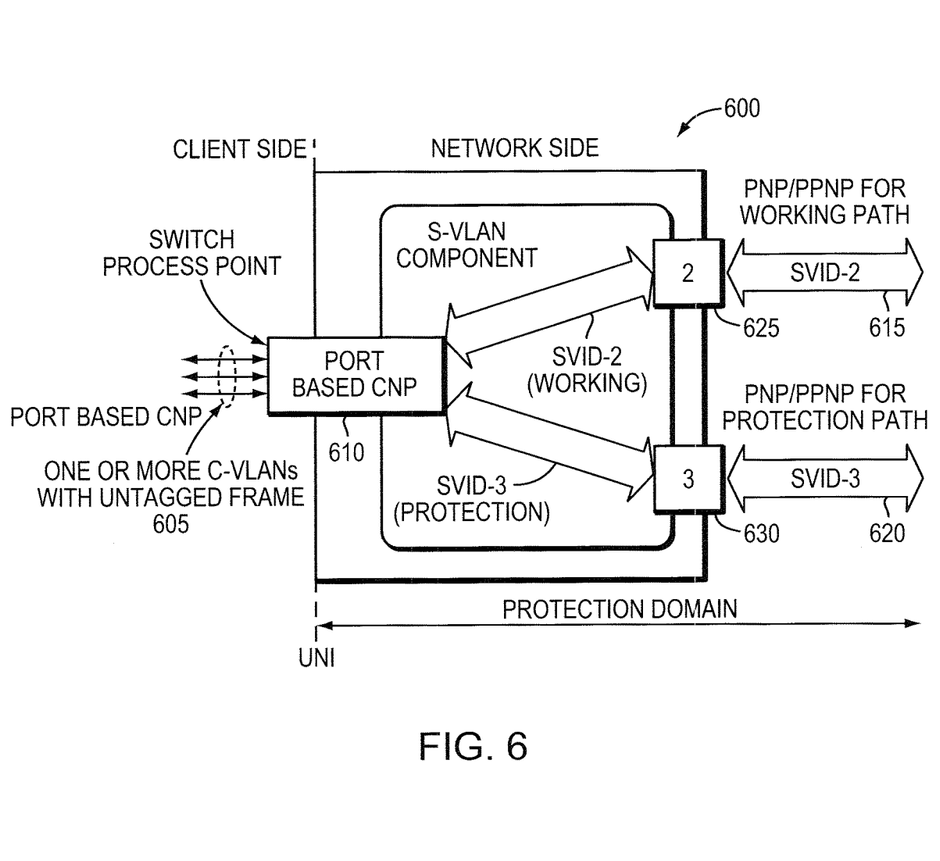
FIG. 6 is a block diagram illustrating an Ethernet Private Line (EPL) protected by a RVT.

FIG. 6 is a block diagram illustrating an Ethernet Private Line (EPL) protected by a RVT. According to the example embodiment, all frames 605, whether tagged or untagged, enter at a port-based Customer Network Port (CNP) 610 of a switch 600, where a UNI is located, and may be mapped to one of the S-VLANs 615, 620 of the RVT by pushing a service tag (S-tag) onto the frames 605. As with the above embodiment, the EPL is protected by a RVT made up of two S-VLAN tunnels 615, 620, identified by VLAN Identifiers (e.g., S-VID=2 and S-VID=3). Working tunnel 615 (S-VID=2) is a point-to-point S-VLAN tunnel between port 2 625 and the port-based CNP 610, and protection tunnel 620 (S-VID=3) is a point-to-point S-VLAN tunnel between port 3 630 and the port-based CNP 610. Both working and protection tunnels 615, 620 use continuity check messages (CCMs) to monitor the health of the tunnels and may report a fault to an APS state machine (not shown). Under normal conditions (i.e., no fault), all frames 605, whether tagged or untagged, may be mapped to the working tunnel 615 (S-VID=2). Upon a fault condition, all frames 605, whether tagged or untagged, may be mapped to the protection tunnel 620 by swapping S-VID tags of the frames 605. The switching point is at the CNP 610 and may in some embodiments be controlled by an APS state machine (not shown). In this embodiment, the protection domain is between UNIs.

Figure 7:
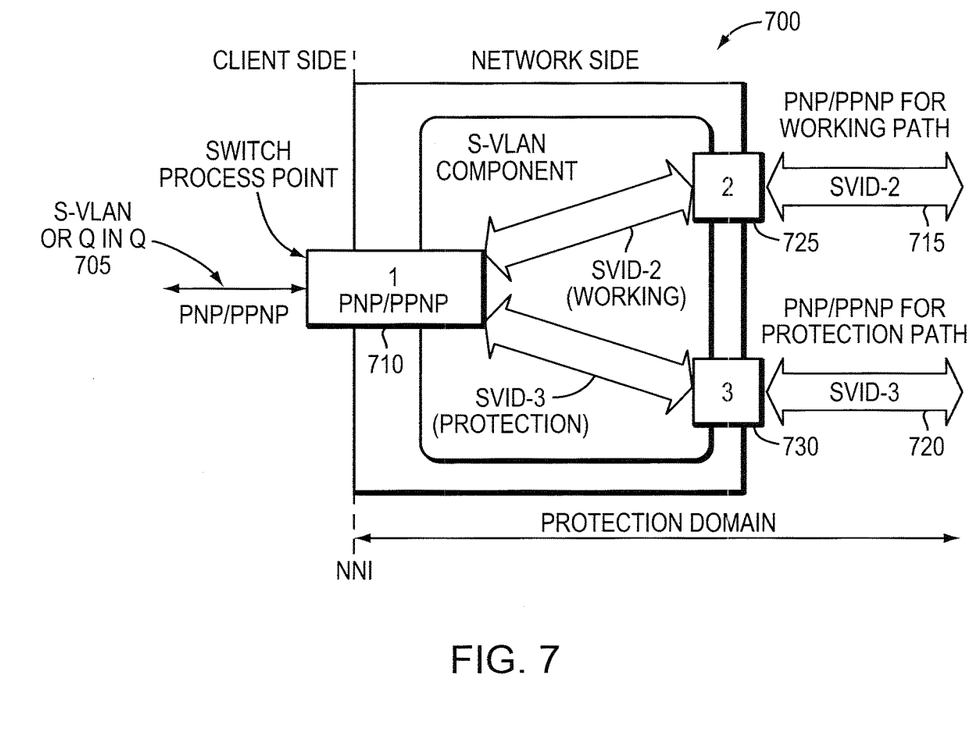
FIG. 7 is a block diagram illustrating a Service VLAN (S-VLAN) Ethernet Virtual Connection (EVC) protected by a RVT.

FIG. 7 is a block diagram illustrating a Service VLAN (S-VLAN) Ethernet Virtual Connection (EVC) protected by a RVT. According to the example embodiment, an S-VLAN based EVC, or Q-in-Q based EVC, 705 is connected to a Provider Network Port (PNP) or Proprietary Provider Network Port (PPNP) 710 of a switch 700 where a Network-to-Network interface (NNI) is located. As with the above embodiments, the EVC is protected by a RVT made up of two S-VLAN tunnels 715, 720, identified by VLAN Identifiers (e.g., S-VID=2 and S-VID=3). Working tunnel 715 (S-VID=2) is a point-to-point S-VLAN tunnel between port 2 725 and port 1 (PNP or PPNP) 710, and protection tunnel 720 (S-VID=3) is a point-to-point S-VLAN tunnel between port 3 730 and port 1 (PNP or PPNP) 710. Both working and protection tunnels use continuity check messages (CCMs) to monitor the health of the tunnels 715, 720 and may report a fault to an APS state machine (not shown). Under normal conditions (i.e., no fault), all S-VLANs frames or Q-in-Q frames may be mapped to the working tunnel 715 (S-VID=2) via outer tag translation of the frames. Upon a fault condition, all S-VLAN frames or Q-in-Q frames may be mapped to the protection tunnel 720 via outer tag translation of the frames. The switching point is at the PNP/PPNP 710 and may in some embodiments be controlled by an APS state machine (not shown). In this embodiment, the protection domain is between NNIs.

Figure 8:
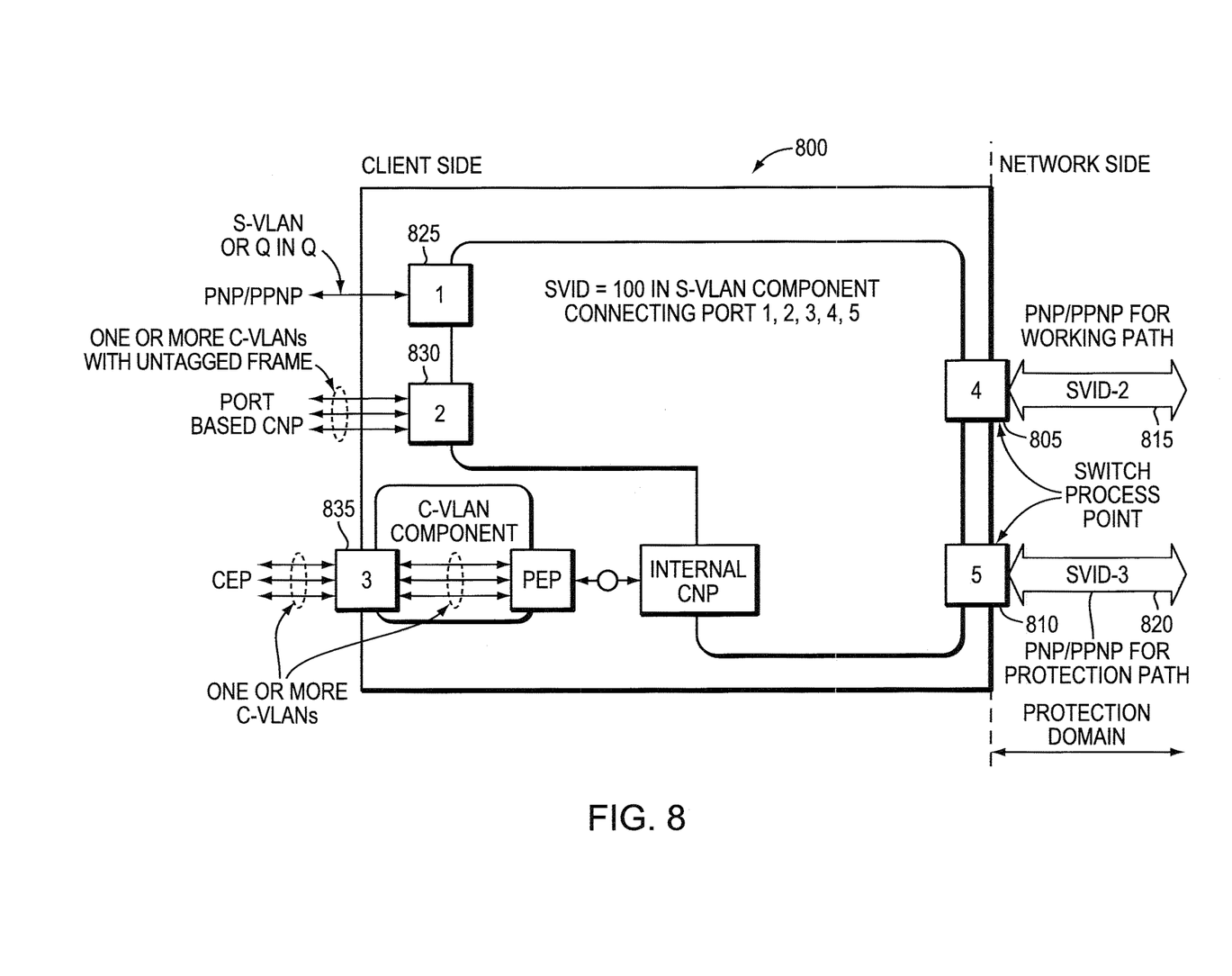
FIG. 8 is a block diagram illustrating an S-VLAN EVC protected by a RVT at the network side of a switch.

FIG. 8 is a block diagram illustrating an S-VLAN EVC protected by a RVT at the network side of a switch 800. According to the example embodiment, the protection domain starts at the network-side ports 805, 810. All ports 825, 830, 835 connecting to the S-VLAN based EVC are protected by the RVT on the network side of the switch 800. Examples of such ports may include a Customer Edge Port (CEP) 835, a port-based Customer Network Port (CNP) 830, or a Provider Network Port (PNP) or Proprietary Provider Network Port (PPNP) 825. As with the above embodiments, the EVC is protected by a RVT made up of two S-VLAN tunnels 815, 820, identified by VLAN Identifiers (e.g., S-VID=2 and S-VID=3). The working tunnel 815 (S-VID=2) is assigned to port 4 805, and the S-VID is translated from 100 to 2. The protection tunnel 820 (S-VID=3) is assigned to port 5 810, and the S-VID is translated from 100 to 3. Both working and protection tunnels 815, 820 use continuity check messages (CCMs) to monitor the health of the tunnels and may report a fault to an APS state machine (not shown). Under normal conditions (i.e., no fault), SVID=2 on port 4 805 is unblocked so that traffic passes on the working tunnel 815, but SVID=3 on port 5 810 is be blocked so that no traffic may pass on the protection tunnel 820. VLAN translation is optional to translate SVID=100 to 2 if the VID is different from the S-VID. Upon a fault condition, port 4 805 for the working tunnel 815 is blocked, and port 5 810 for the protection tunnel 820 is unblocked. S-VID may be translated from SVID=100 to 3 at port 4 805. The switching point is at the network-side ports 805, 810 and may in some embodiments be controlled by an APS state machine (not shown). In this embodiment, the protection domain is between network-side ports of the network equipment involved.

Figure 9:
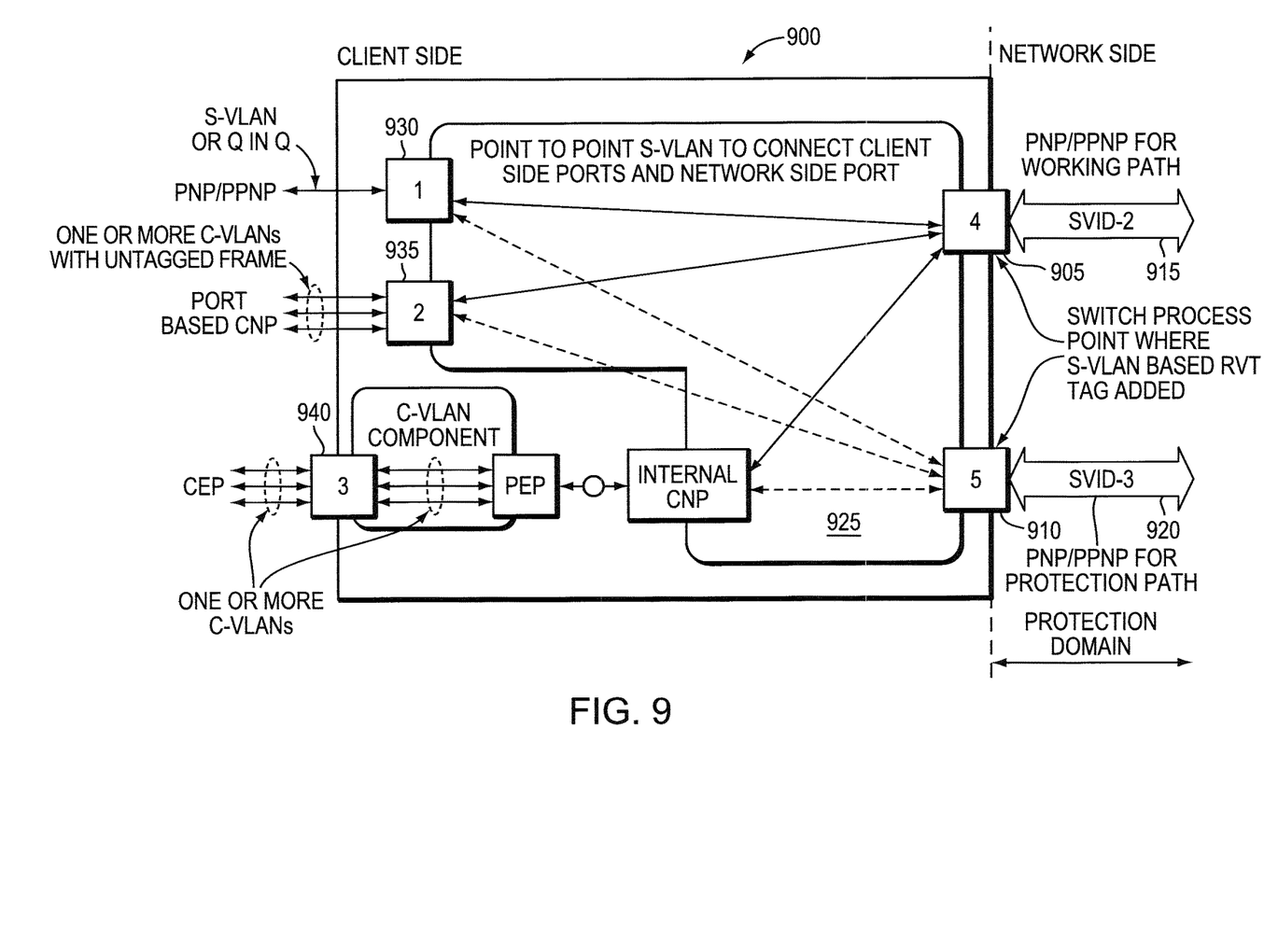
FIG. 9 is a block diagram illustrating a cross-connect based S-VLAN Ethernet Line (E-LINE) protected by a RVT at the network side of a switch.

FIG. 9 is a block diagram illustrating a cross-connect based S-VLAN Ethernet Line (E-LINE) protected by a RVT at the network side of a switch 900. According to the example embodiment, the protection domain starts at the network-side ports 905, 910. All ports 930, 935, 940 connect to an RVT tunnel port 905, 910 using a VLAN cross connect 925 and are protected by the RVT 915, 920. Examples of such ports may include a Customer Edge Port (CEP) 940, a port-based Customer Network Port (CNP) 935, or a Provider Network Port (PNP) or Proprietary Provider Network Port (PPNP) 930. As with the above embodiments, the EVC is protected by a RVT made up of two S-VLAN tunnels 915, 920, identified by VLAN Identifiers (e.g., S-VID=2 and S-VID=3). The working tunnel 915 (S-VID=2) is assigned to port 4 905, and an RVT tag for the working tunnel 915 may be added for egress traffic or popped for ingress traffic. The protection tunnel 920 (S-VID=3) is assigned to port 5 910, and the RVT tag for the protection tunnel 920 may be added for egress traffic or popped for ingress traffic. Both working and protection tunnels 915, 920 use continuity check messages (CCMs) to monitor the health of the tunnels and may report a fault to an APS state machine (not shown). Under normal conditions (i.e., no fault), traffic is sent to or received from the working tunnel 915 port (port 4) 905, and the working RVT tunnel tag is added for transmitted traffic or popped for received traffic. Upon a fault condition, traffic is switched to the protection RVT tunnel 920 port (port 5) 910 using the cross connect 925. The switching point is at the network-side ports 905, 910 and may in some embodiments be controlled by an APS state machine (not shown). In this embodiment, the protection domain is between network-side ports of the network equipment involved.

Figure 10:
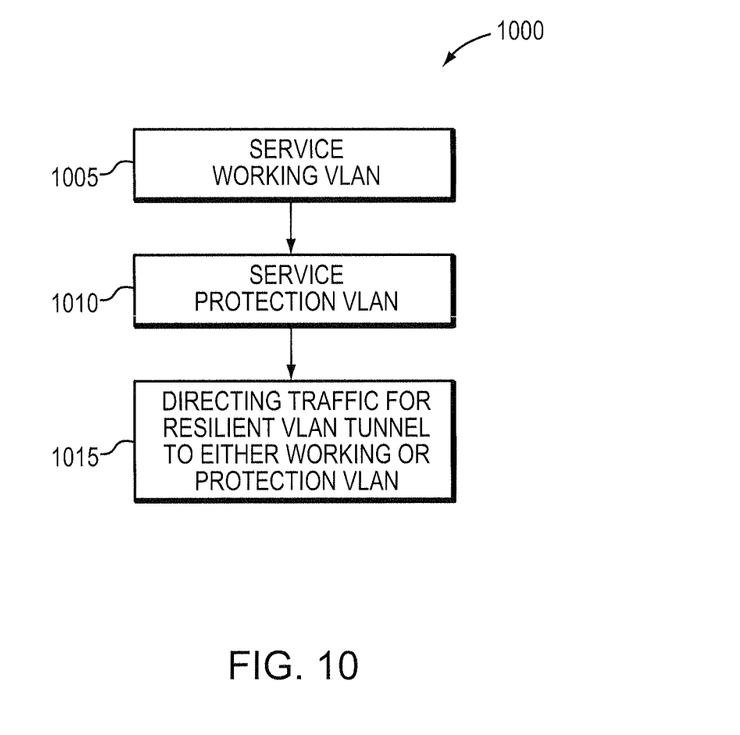
FIG. 10 is a flow diagram illustrating a method for providing a RVT.

FIG. 10 is a flow diagram illustrating a method for providing a resilient virtual local area network (VLAN) tunnel. The method involves servicing a working service VLAN and a protection service VLAN (1005, 1010) and directing traffic bound for the resilient VLAN tunnel to either the working service VLAN or the protection service VLAN (1015).

While this invention has been particularly shown and described with references to example embodiments thereof, it will be understood by those skilled in the art that various changes in form and details may be made therein without departing from the scope of the invention encompassed by the appended claims.

It should be understood that the flow diagrams of FIGS. 4 and 10 are examples that can include more or fewer components, be partitioned into subunits, or be implemented in different combinations. Moreover, the flow diagrams may be implemented in hardware, firmware, or software. If implemented in software, the software may be written in any software language suitable for use in the networks and switches illustrated in FIGS. 1, 3, and 5-9 with traffic including information as illustrated in FIG. 2. The software may be embodied on any form of computer readable medium, such as RAM, ROM, or magnetic or optical disk, and loaded and executed by generic or custom processor(s).

What is claimed is:

1. A node in a communications network, the node comprising:
   a translation module configured to translate a switch command, received from a management system, to a switch message to cause a peer node in the communications network to perform a switching action consistent with the switch command;
   a packet generation module to generate a packet with the switch message embedded in the packet, the packet generated being a continuity check message (CCM) including the switch message;
   a transmission module to transmit the packet to the peer node; and
   a switching module configured to perform a switching action consistent with the switch command received from the management system.

2. A node as in claim 1 wherein the continuity check message includes additional type-length-value information that includes the switch message.

3. A node as in claim 2 wherein the switch message causes the peer node to perform any of a manual switch to working path, manual switch to protection path, force switch, and lock out protection actions.

4. A node as in claim 2 wherein the type-length-value information includes a traffic bit to indicate how traffic is being transmitted by the node.

5. A node as in claim 1 wherein the management system is any of an element management system (EMS), network management system (NMS), and craft station.

6. A node as in claim 5 wherein the node is locally connected to the management system.

7. A node as in claim 5 where the node is remotely connected to the management system via a Data Communications Network (DCN).

8. A node as in claim 1 wherein the switching module is configured to perform, in an event the node receives from the peer node a packet that includes a switch message based on a switch command received at the peer node from the management system, a switching action consistent with the switch command received at the peer node and the switch message received from the peer node.

9. A node as in claim 1 wherein the switching module is configured to perform, in an event the node receives from the peer node a packet that has a traffic bit in the type-length-value information, a switching action consistent with the traffic bit.

10. A node as in claim 1 wherein the switching action performed is implemented based on a port type.

11. A method of transmitting switch commands in a communications network, the method comprising:
   translating a switch command, received from a management system, to a switch message to cause a peer node in the communications network to perform a switching action consistent with the switch command;
   generating a packet with the switch message embedded in the packet, the packet generated being a continuity check message (CCM) including the switch message;
   transmitting the packet to the peer node; and
   performing a switching action consistent with the switch command received from the management system.

12. A method as in claim 11 wherein generating a continuity check message (CCM) includes generating additional type-length-value information that includes the switch message.

13. A method as in claim 12 further including causing the peer node to perform any of a manual switch to working path, manual switch to protection path, force switch, and lock out protection actions.

14. A method as in claim 12 wherein generating additional type-length-value information includes generating a traffic bit to indicate how traffic is being transmitted.

15. A method as in claim 11 wherein the management system is any of an element management system (EMS), network management system (NMS), and craft station.

16. A method as in claim 11 further including implementing the switching action based on a port type.

* * * * *